United States Patent [19]
Vales

[11] Patent Number: 5,490,743
[45] Date of Patent: Feb. 13, 1996

[54] SYSTEM FOR INSTALLING MATERIAL IN THE GROUND

[75] Inventor: Enoch S. Vales, Waterloo, Canada

[73] Assignee: University of Waterloo, Waterloo, Canada

[21] Appl. No.: 262,277

[22] Filed: Jun. 20, 1994

[30] Foreign Application Priority Data

Jun. 21, 1993 [GB] United Kingdom .................... 9312767

[51] Int. Cl.⁶ ........................................................ F02D 7/00
[52] U.S. Cl. ........................ 405/266; 405/258; 405/267
[58] Field of Search .................... 405/50, 267, 274–281; 210/170, 797

[56] References Cited

U.S. PATENT DOCUMENTS

| | | | |
|---|---|---|---|
| 3,646,766 | 3/1972 | Hilton et al. ................................. | 405/50 |
| 3,667,236 | 6/1972 | Rosene ....................................... | 405/50 |
| 4,027,488 | 6/1977 | Preradovich ............................... | 405/279 |
| 5,216,863 | 6/1993 | Nessa et al. ................................ | 405/267 |
| 5,240,348 | 8/1993 | Breaux ....................................... | 405/267 |

FOREIGN PATENT DOCUMENTS

| | | | |
|---|---|---|---|
| 0131711 | 10/1981 | Japan ........................................ | 405/279 |
| 0205615 | 12/1982 | Japan ........................................ | 405/267 |
| 0158513 | 7/1986 | Japan . | |
| 561765 | 6/1944 | United Kingdom .................... | 405/279 |

Primary Examiner—Ramon S. Britts
Assistant Examiner—Frederick Lagman
Attorney, Agent, or Firm—Anthony Asquith & Co.

[57] ABSTRACT

For providing an in-ground system for treating contaminated groundwater, of the funnel-and-gate type, a cylindrical caisson is driven into the ground. The native soil is augered out of the caisson, and porous treatment material substituted. The caisson is then withdrawn, leaving a prism of porous treatment material in the ground. A sheet metal barrier element is inserted into the ground, one portion of the element extending into the prism and the other portion into the surrounding soil. More prisms are provided as further treatment gates, and more barrier elements are arranged to funnel the groundwater through the gates.

20 Claims, 6 Drawing Sheets

5,490,743

SYSTEM FOR INSTALLING MATERIAL IN THE GROUND

This invention is concerned with placing materials and substances in the ground. A preferred application of the invention is for the placement of treatment material in the ground, being material for the treatment of polluted or contaminated groundwater. The material may be required to be placed for example in the ground in the path of an oncoming plume of contaminated water.

The invention is particularly suitable for the case where the material to be inserted in the ground forms a component of a system for containing or guiding groundwater, and where groundwater must be prevented from leaking—including leaking through a watertight barrier, or leaking through the junction between a watertight barrier and a body of permeable treatment material. The invention is particularly suitable for the case where the material to be inserted in the ground is porous material comprising the gate of a funnel-and-gate groundwater treatment system, and where waterproof barrier elements serve to guide or funnel contaminated groundwater through the gate.

DETAILED DESCRIPTION OF PREFERRED EMBODIMENTS

By way of further explanation of the invention, exemplary embodiments of the invention will now be described with reference to the accompanying drawings, in which.

The apparatuses shown in the accompanying drawings and described below are examples which embody the invention. It should be noted that the scope of the invention is defined by the accompanying claims, and not necessarily by specific features of exemplary embodiments.

Figure 1A:
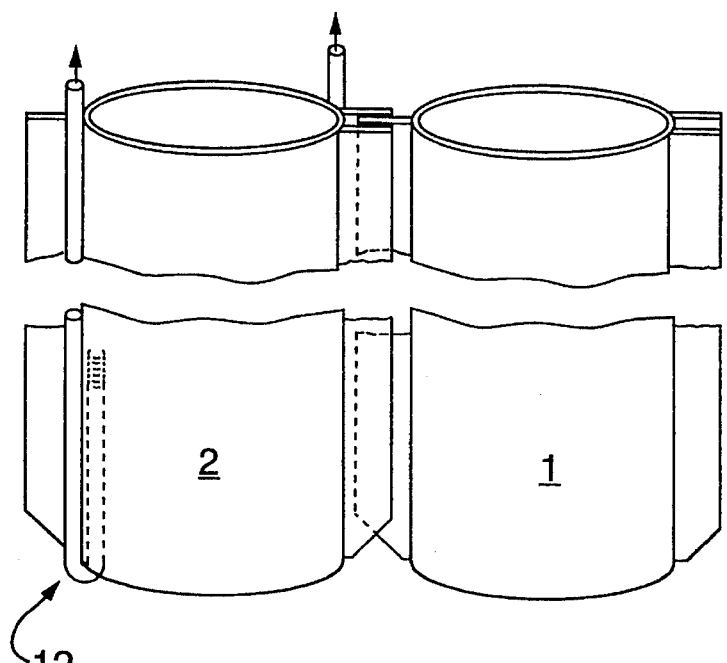
FIG. 1A is a pictorial view of a system for installing treatment material in the ground, in the path of an oncoming plume of contaminated groundwater flowing through an aquifer.
Figure 1B:
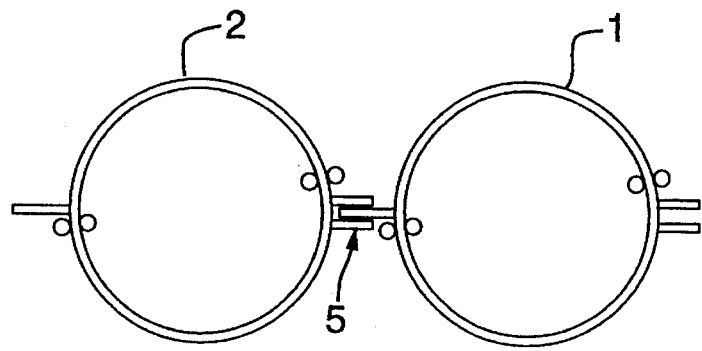
FIG. 1B is a plan view of the system of FIG. 1A, illustrating a stage of installation.

In FIGS. 1A and 1B, a set of two tube-form caissons 1, 2 is provided, having blade-like wings as shown welded on the sides. These caissons are pile-driven down into the ground, side by side, as shown. The single left-side wing on caisson 1 (which is driven first) is arranged to engage, during driving, between the double right-side wings of caisson 2 (which is driven second).

When the caissons are in place in the ground, soil may be removed from inside the caissons, by augering or other suitable processes. The emptied caissons are then filled with the suitable appropriate treatment material for treating the contaminants in the groundwater.

Now, the first caisson 1 is removed from the ground, leaving the first body 3 of treatment material behind as a prism in the ground.

The extracted first caisson 1 is then taken around to the other side of the second caisson 2, and is driven into the ground alongside same. Again, the blades or wings interact, to keep the caissons aligned.

With the first caisson 1 once more fully in the ground, the second caisson 2 is now withdrawn from the ground, leaving a second prism of treatment material 4 in the ground. The second caisson is removed, and again driven down into the ground on the far side of the first caisson.

A series of cylindrical bodies of treatment material are therefore progressively created in the ground, each prism of treatment material being spaced apart from its neighbours by a distance, as set by the designer, with reference to the lengths of the wings.

The ground between the prisms of treatment material bears what amounts to a slot 5, being the area of the ground where the soil has been disturbed by the entry into, and withdrawal of, the blade-like wings of the caissons. This slot of broken soil helps guide the path of the element down into the ground, and helps prevent the element from being deflected laterally, and perhaps out of contact with the prism.

To seal off the area between the prisms of treatment material, a pile-element 6 is driven into the ground, and into the slot, between the adjacent cylindrical bodies 3, 4. In other installations, an H-beam or other suitable section may be used to provide a partition between the cylinders of treatment material.

The designer knows that often a sheet metal element, even though intended to enter the ground vertically straight down, will deviate laterally to some extent underground. In this case, the element 6 is guided to stay in the correct line by the presence of the slot.

It may be noted that the tube-form caissons are very rigid. It can be expected that the wings will remain in engagement with each other, and will not separate below ground, because the caissons are so rigid. The wings should, of course, be made long enough that they cannot disengage below ground. The spacing apart of the caissons, and the spacing apart of the cylinders of treatment material, depends also on the length of the wings.

Figure 1C:
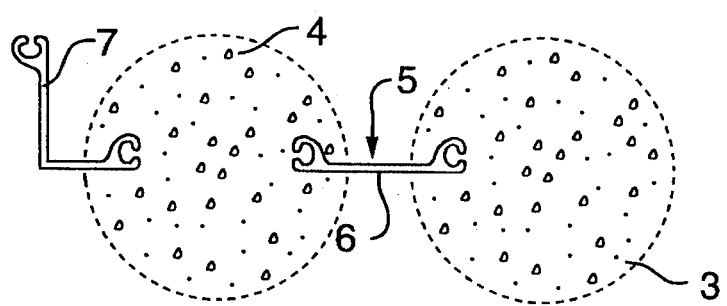
FIG. 1C is the same plan view, showing the treatment material installed in the ground.

The element 6 lying between the cylinders serves to ensure that water cannot pass between the cylinders of treatment material, and thereby pass through the treatment facility untreated. One of the aspects of ensuring that the contaminated groundwater is properly treated is to make sure the water spends an adequate residence time in contact with the treatment material. There should be no short cuts whereby the water can avoid the treatment material. Thus, the elements 6 should extend a good distance into the body of treatment material, as shown in FIG. 1C. The designer should see to it that the distance is large enough to ensure that water passing over the minimum distance is still adequately treated.

It may be desired to funnel the contaminated water into the area where the cylinders of treatment material are located. For this reason, side wings 7 may be added. The side wings should be of the watertight type. Patent publication number WO 93/22241 (University of Waterloo) describes funnel-type barriers of this kind.

In designing the system, including the side wings if any, the designer should bear in mind the local water table conditions, the permeability of the ground, the velocity of the flow of groundwater, etc. Of course, he should see to it that the treatment facility will not act like a barrier to the extent of causing water to build up upstream of the facility, and eventually overflowing around it.

In the systems with which the invention is concerned, the alternative to treating the water in-situ is to take the water out of the ground to treat it, which is much more expensive. When contemplating the use of the system of the invention, however, the designer must be satisfied that contaminated water cannot leak around the treatment facility. Sometimes, virtually no leakage at all of the contaminated water can be tolerated; where the contaminant is toxic, for example. The invention leads to a virtually escape-proof treatment system, that is nevertheless economical.

Figure 2:
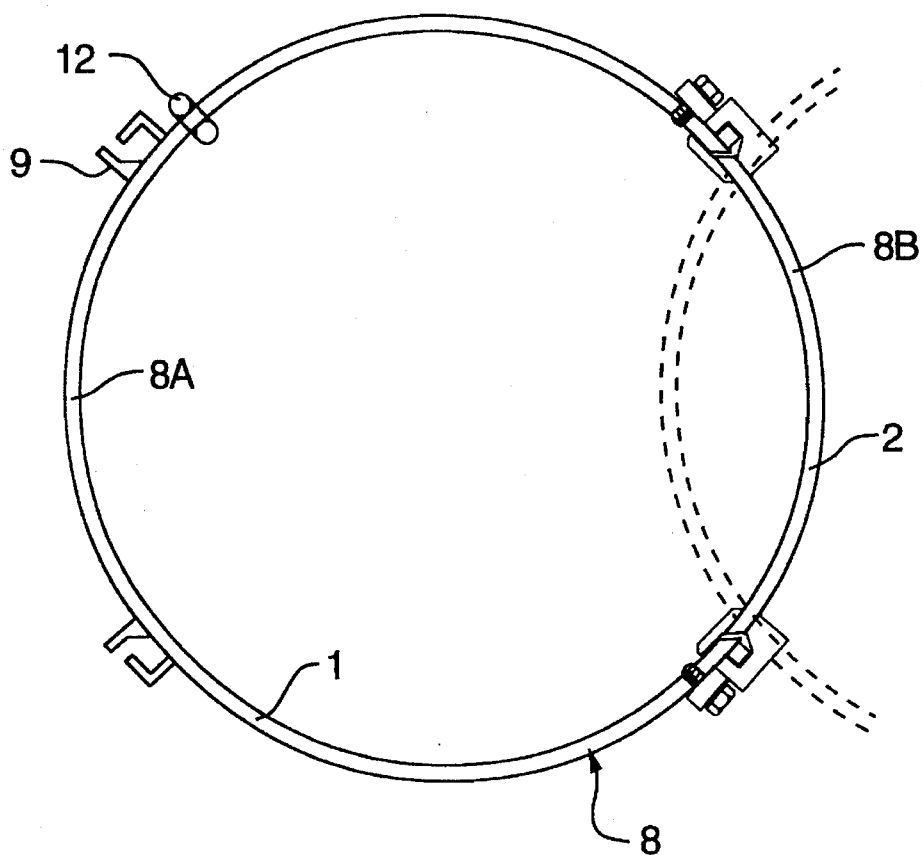
FIGS. 2 and 2A are plan views of an alternative system.

FIG. 2 shows a different, but related, system. Here, the caisson 8 is in two parts 8A, 8B. The two parts are assembled together, as shown in FIG. 2, prior to driving of the assembled caisson into the ground. Once the composite first caisson is in the ground, excavated and backfilled with the treatment material, the part 8B is withdrawn, leaving the part 8A still present in the ground.

Now, a second caisson is assembled from a new part 8A and part 8B. This second caisson carries rails 9, which are adapted to engage the now-free ends of part 8A of the first caisson. The second caisson is thereby constrained to lie alongside the part 8A of the first caisson, which is already embedded in the ground. The second caisson is driven down, with the rails 9 engaged. When the second caisson has been driven into the ground, excavated and backfilled with treatment material, the part 8A of the first caisson can be withdrawn, and assembled together with part 8B. Then the part 8B from the second caisson can be lifted, and third caisson driven in, the rails again being used to align the third caisson with the second caisson.

For its installation, the third caisson may be guided by rails on the other side of the second caisson.

The caissons are emptied of native soil, and then filled with treatment material, always before dismantling, in the manner as was done in FIG. 1. A series of overlapping cylinders of treatment material, or rather in this case a series of overlapping sectors of cylinders, is progressively built up. The parts 8B of the composite caissons are withdrawn after the treatment material is in place.

Figure 2A:
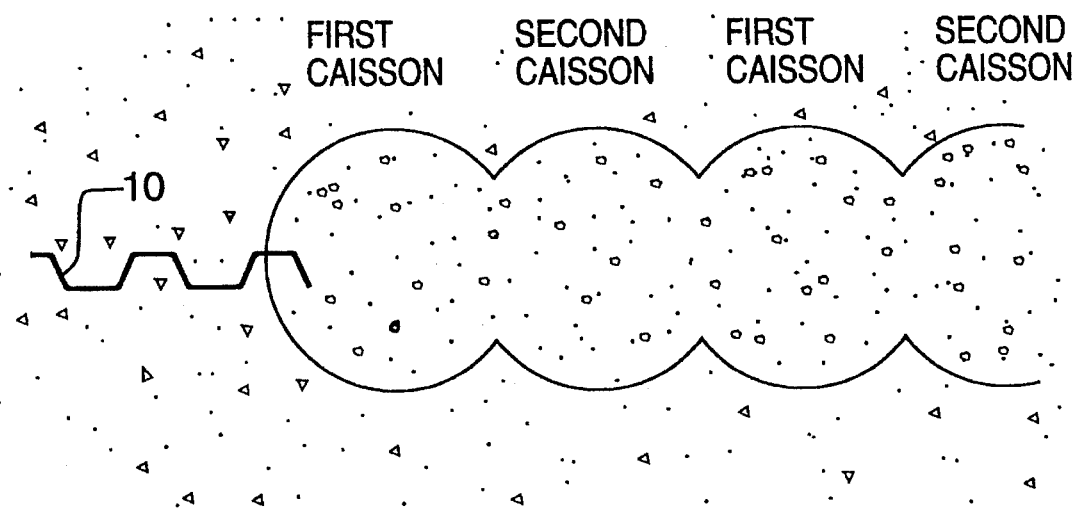

In FIG. 2, the cylinders of treatment material overlap; there is no gap between the cylinders as in FIG. 1. The series of cylinders may be arranged as a complete water treatment wall, whereby the plume of contaminated water passes through the wall of overlapping cylinders. Alternatively, the series of cylinders of treatment material may be arranged as a gate in a waterproof wall, whereby the plume is funnelled into the wall of cylinders. An element of the waterproof wall can be seen at 10 in FIG. 2A.

Again, the designer should see to it that the element is placed far enough into the body of treatment material that there is no short cut whereby water could pass through untreated, or only inadequately treated.

When the caissons are not anchored into underlying clay, and being emptied of soil, often the caissons will start to fill with water seeping in from underneath the caisson. This can be troublesome in some cases. A de-watering facility is therefore provided, which comprises a pipe 12. The pipe is welded to the caisson. The up-turned bottom end of the pipe has an open mouth, through which water inside the caisson can be drawn out. The number of, or the size of, the de-watering pipe is set to cope with the anticipated in-flow of water.

Figure 3:
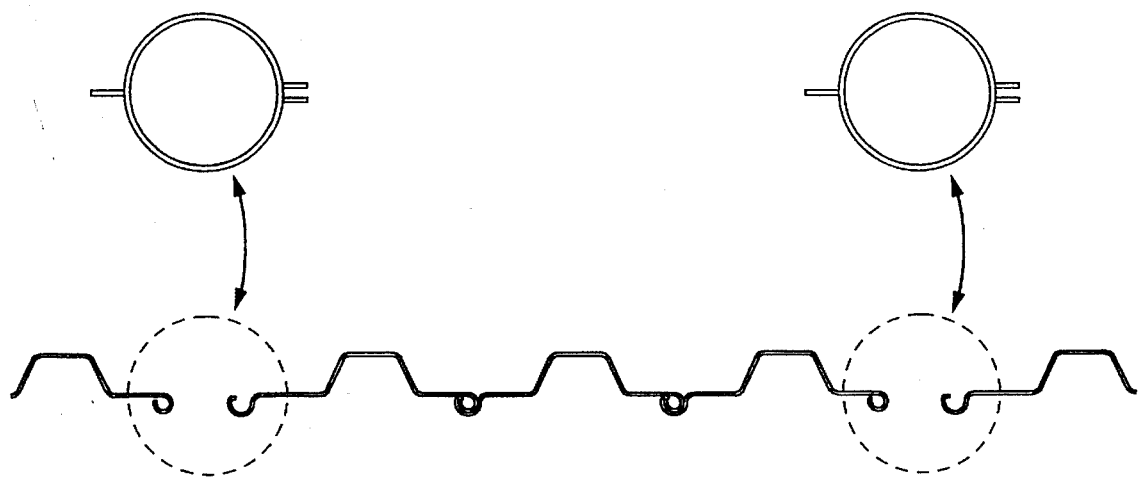
FIG. 3 shows diagrammatically another system.
Figure 4:
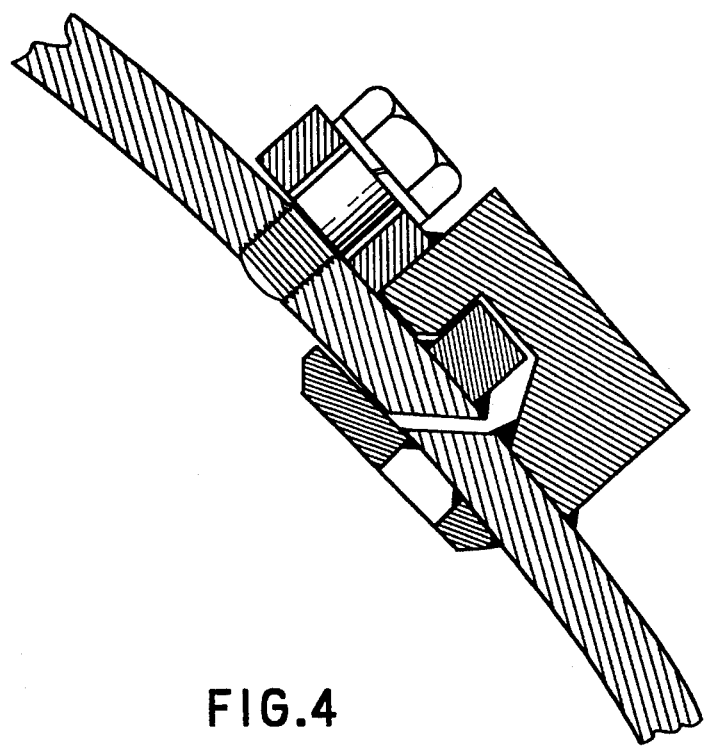
FIG. 4 is a close-up of a guide rail as used in the system of FIG. 2.

FIG. 3 shows caissons spaced well apart. In this case, the gap between the caissons is provided with a waterproof partition comprising a number of pile-driven elements.

The caissons have to be driven into the ground, the caissons de-watered, the soil drilled out, the caissons filled with treatment material, and the caissons withdrawn, before the pile elements can be inserted into the ground. The requirements of the partition must therefore be planned for at the time the caissons are inserted. The distance apart of the caissons, especially, must be set so that the end elements of the partition will engage a minimum needed distance into the respective bodies of treatment material. The blades or wings on the caissons do not interengage when the caissons are far apart, but they still play a part, in that they prepare a slot in the ground to guide the ends of the partitions.

The designer must of course see to it, when he is placing the caissons far apart, that the groundwater flow is low enough that the spaced gates of treatment material can handle the flow, and that the concentration of the contaminants will not be too much for the treatment material.

In the above, when pile-driven elements are called for, suitable watertight joints at the interlocking edges of the elements should be provided.

If it should be desired to replenish the body of treatment material in the future, the following procedure may be followed. First, the partitions between the bodies of treatment material are removed. Then, a new caisson is driven down over the treatment material. It is best if this new caisson is larger than that used originally. The old material is removed from inside the new caisson, and new material added. When that is complete, the new caisson is removed, and the partition replaced.

The invention is not limited to a particular type of treatment material. The invention is applicable in cases where groundwater is contaminated with a contaminant which can be treated by passing the water through a body of treatment material.

In fact, the invention may be used for purposes other than treatment of contaminated groundwater. The material placed in the caissons may be, for example, bentonite sealant. The invention may also be used for the purpose of providing in-ground concrete columns for building foundations, etc. Reinforcement rods may be embedded in such concrete columns. The invention may also be used in connection with the building of dams and other retaining structures.

In the case where the barrier is installed over bedrock, it can be a problem to seal underneath the barrier, ie between the bottom of the barrier and the bedrock. Sealing of the piles towards the bedrock can be addressed as follows.

A description of sealable piles is in patent publications WO 93/09298 and GB-2,228,760 of the University of Waterloo.

The cavity for injecting the sealants between two piles can be use temporarily during the construction of the wall for placing steel tube through which the seal can be injected out between the bottom edge of the pile and bedrock.

Figure 5:
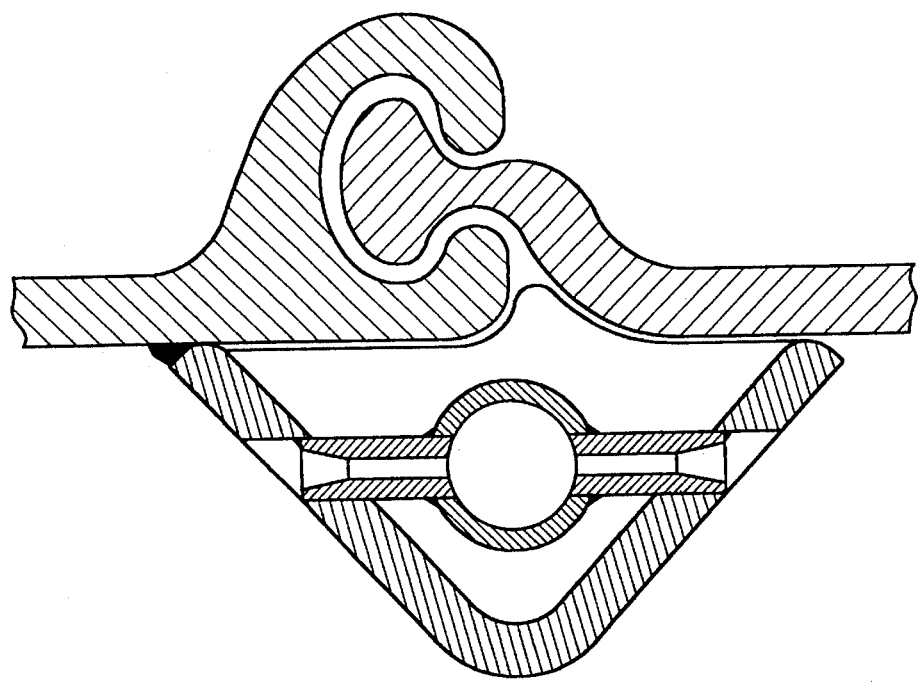
FIG. 5 is a plan view of a through-hole structure at the bottom of a joint between barrier elements.
Figure 6:
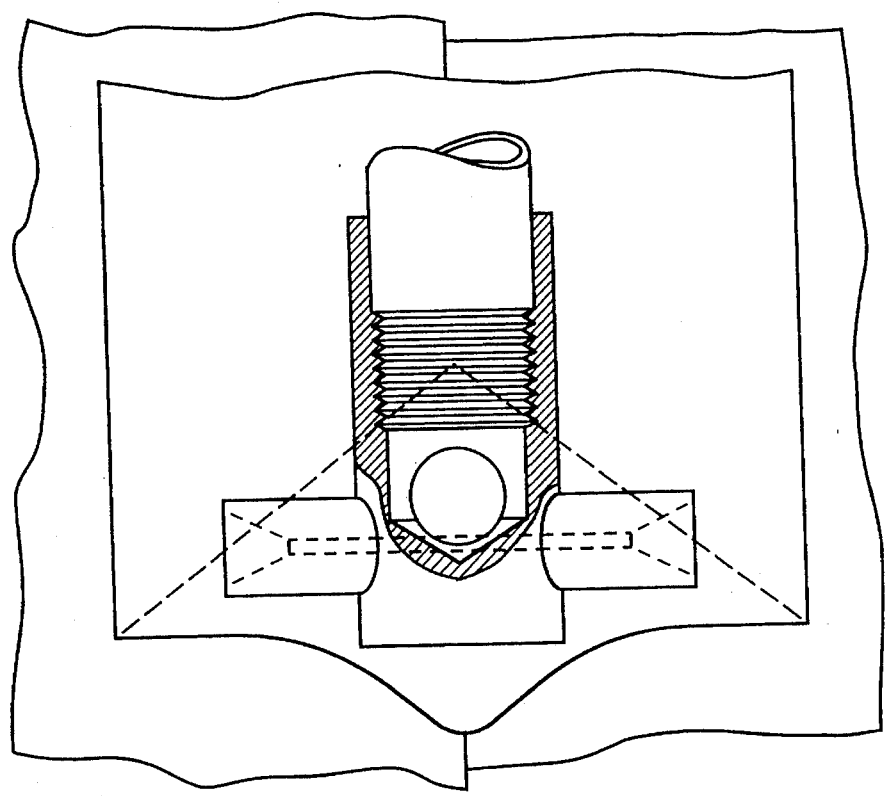
FIG. 6 is a side elevation of the structure of FIG. 5.
Figure 7:
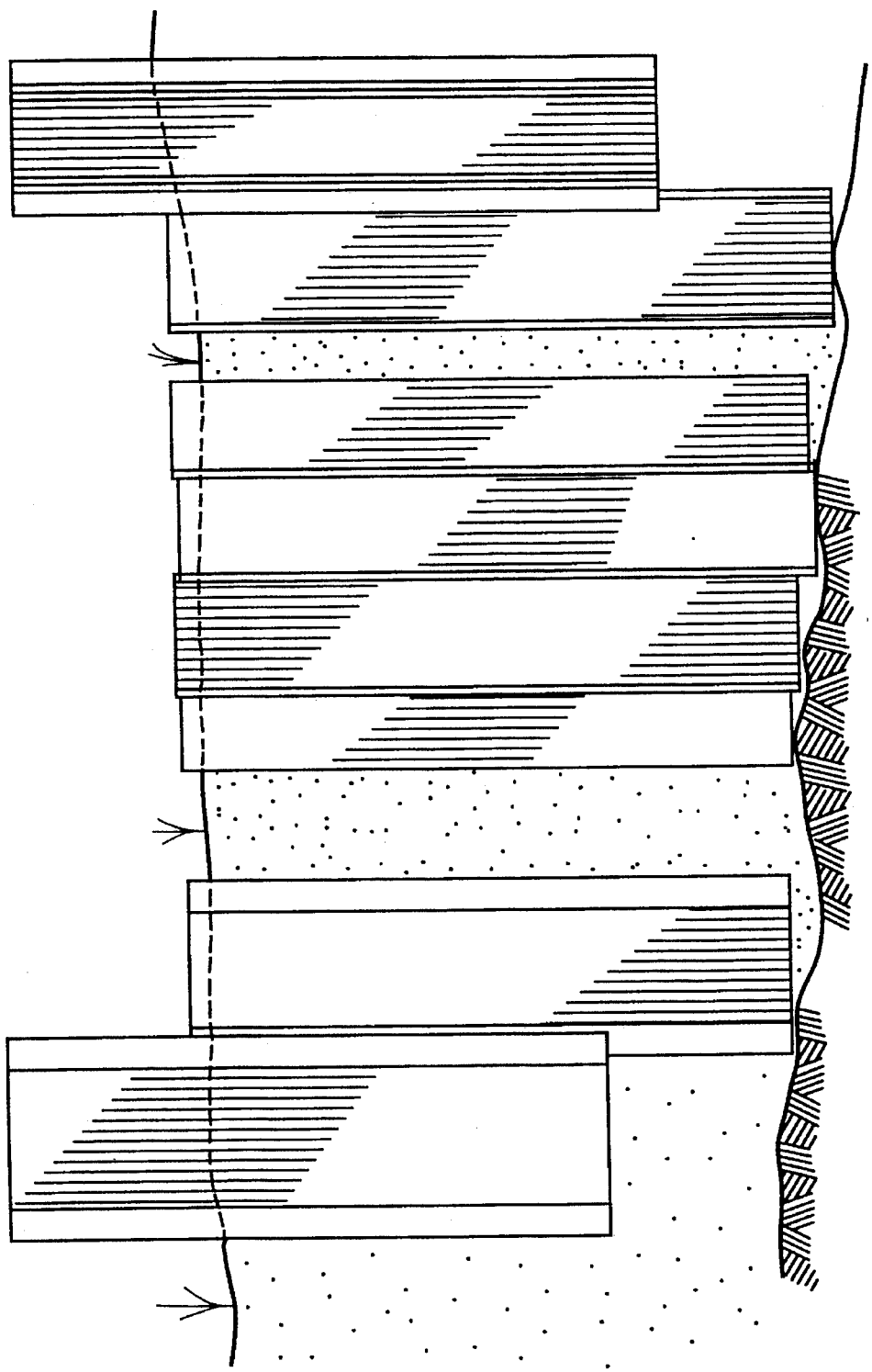
FIG. 7 is a side view of another system.
Figure 8:
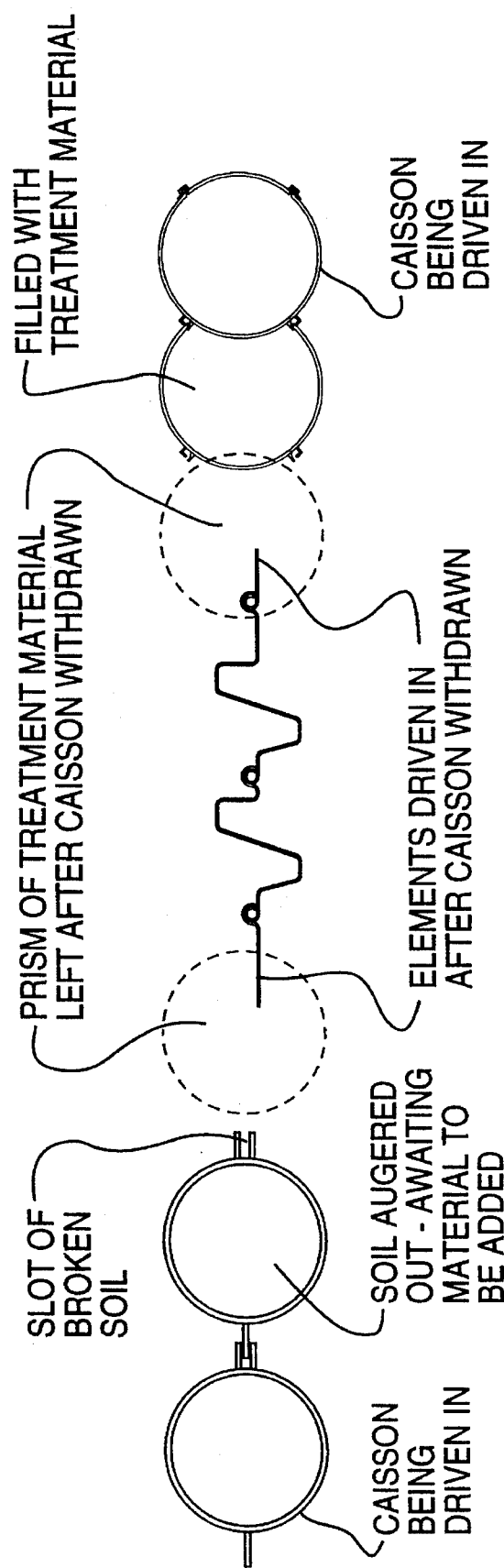
FIG. 8 is a plan view of the system of FIG. 7.

At the bottom of the cavity in the area of the scraper is fastened a two-direction injecting device as shown in FIGS. 5 and 6. This device is connected by a steel tube to the top end of the steel pile and to a high pressure slurry pump.

The injection of the slurry can be done during the process of installation of the piles for the purpose of lubricating the piles if the penetration is very slow and hard. But in a normal condition the injection of sealant will start when the sheet pile reaches the bedrock. The slurry penetrates the soil in such situations about 50 cm in both directions. The piles which touch the bedrock may be lifted up about 15 cm and then driven down again, several times, while slurry is injected, whereby the slurry will penetrate the soil and expand in all directions from the injection area, to ensure there will be enough sealable slurry between the bedrock and the sheet piles.

Another problem can arise with the installation of treatment material in the ground.

During the vibration of sheet piles, and mainly of caisson itself, the soil and the injected material consolidates, and becomes less permeable than is desirable.

To loosen the soil in the areas at front and back of the caisson can be done by auguring an adequate number of holes (as needed) in the areas, lifting out the cuttings, and letting the soil inside of the hole freely collapse.

To achieve a desired looseness in the high permeability and homogeneously distributed material in the caisson may be addressed as follows.

The back filled treating mixture preferably should be more permeable than the native soil, to permit a faster through-flow rate of groundwater. Looseness of the material can be enhanced by using for example chips of hard wood, also chips from bamboo, which are porous in full cross section. Or, where the treatment material is mixed, as usual, with coarse sand, porous ceramic pellets can be added, and will maintain higher porosity and resistance to the loss, over a long period, of porosity due to consolidation.

We claim:

1. Procedure for installing a prism of material and a barrier element in the ground, including the steps:

of providing a caisson, wherein:

the caisson has a generally tubular wall, which is such as to form a complete encirclement around a hollow interior;

the wall of the caisson is so formed as to be capable of being pile-driven into the ground as an integral whole tubular unit;

the caisson includes a side-blade, which is of a sturdy and robust character, and which is attached to the outside of the wall of the caisson, and is attached robustly and sturdily enough that the side-blade remains firmly in position on, and integral with, the wall during pile-driving of the caisson;

the side-blade extends in a generally radial direction away from the location at which the blade is attached to the wall;

of pile-driving the caisson down into the ground, whereby the side-blade cuts a slot down through the ground soil adjacent to the caisson wall during the pile-driving;

with the caisson in place in the ground, of extracting the native soil from the hollow interior of the caisson;

with the caisson still in place in the ground, of introducing a body of material into the hollow interior of the caisson;

of withdrawing the caisson up out of the ground, whereby a prism of the material is left in the ground;

of inserting a waterproof barrier element down into the ground, wherein:

the location of the element during and after insertion is such that a first portion of the element lies in the slot cut down into the ground by the side-blade:

the location of the element during and after insertion is such that a second portion of the element extends into, and lies within, the said body of material.

2. Procedure of claim 1, wherein the element, after having been positioned in the slot, is inserted into the ground by pile-driving the element.

3. Procedure of claim 1, wherein the procedure is adapted for installing a pair of prisms of material in the ground, and for providing a barrier element extending between the prisms, including the steps:

of providing the said prism of material in the ground at a first location:

of providing a corresponding prism of material in the ground at a second location;

wherein the two locations are spaced apart, and are so arranged that the slot cut by the side-blade extends into the space between the two prisms;

and wherein the location of the element during and after insertion is such that a third portion of the element extends into, and lies within, the body of material of the second prism.

4. Procedure of claim 3, wherein the locations and the side-blade are so arranged that the slot cut by the side-blade extends across the whole distance between the two prisms.

5. Procedure of claim 4, wherein the locations and the side-blade are so arranged that the slot cut by the side-blade extends over the whole height of the prisms.

6. Procedure of claim 1, wherein the procedure includes the steps:

of providing two caissons, caisson A and caisson B;

wherein: the side-blade of caisson A is on the left of caisson A, and the side-blade of caisson B is on the right of caisson B;

the left side-blade of caisson A is capable of complementary interengagement with the right side-blade of caisson B;

the inter-engagement is such as to ensure that, when the side-blades are inter-engaged, and when caisson B is being driven, that the side-blade of caisson B is constrained to travel into the ground without deviating from a path defined by the inter-engagement of the side-blades;

of timing the driving of the caissons such that caisson A is in the ground when caisson B is being driven;

of so locating the caissons that the side blade of caisson B inter-engages the side blade of caisson A when caisson B is being driven, and of driving caisson B.

7. Procedure of claim 6, wherein caisson A also has a right side-blade and caisson B also has a left side-blade, which are capable also of complementary inter-engagement, and the procedure includes the steps:

of driving caisson A, of then placing caisson B in position to the left of caisson A, of then engaging the left blade of caisson A with the right blade of caisson B, of then driving caisson B, of then lifting caisson A out, of then moving caisson A into position to the left of caisson B, of then engaging the right blade of caisson A with the left blade of caisson B, of then driving caisson A, of then lifting caisson B out, of then placing caisson B in position once more to the left of caisson A, and of continuing same as required;

whereby a series of spaced-apart prisms of material are left in the ground, with slots of broken ground, cut by the blades, between adjacent prisms in the series;

of inserting waterproof barrier sheet elements into the slots, whereby the elements straddle between the adjacent prisms, and extend into the material of both the adjacent prisms.

8. Procedure of claim 1, wherein:

the material in the prism is a material for effecting treatment of groundwater;

the prism and the element are placed in a flow path of moving groundwater, whereby groundwater is constrained to flow through the prism;

the element is so placed in relation to the prism that an edge of the barrier engages far enough into prism that the shortest path the groundwater can follow around the edge of the element and through the prism is long enough to ensure a sufficient residence time of the water in the prism that treatment is effected.

9. Procedure of claim 1, wherein the caisson, and the resulting prism of material, is right-cylindrical.

10. Procedure of claim 1, wherein the material is more permeable than the native soil.

11. Procedure of claim 1, wherein, in order to increase the permeability of the native soil in the region of the installation, the procedure includes the steps, after installation of the prisms and the elements, of making many holes down into the native soil in the region of the prisms.

12. Procedure of claim 11, including the step of extracting soil from the holes, whereby the holes collapse inwards.

13. Procedure of claim 11, including the step of filling the holes with material of the kind having a long-lasting porous or permeable character.

14. Procedure for inserting a wall of material into the ground, including the steps:

of providing a caisson P, wherein:
the caisson P is a structure having a generally tubular wall, the wall being in two separably engageable sectors, PA and PB, which are such, when enagaged, as to form a complete encirclement around a hollow interior;
the caisson is so formed as to be capable, when the two separable sectors are engaged, of being pile-driven into the ground as an integral whole tubular unit;

of pile-driving the caisson P, with the two sectors PA and PB engaged, down into the ground;

with the caisson P in place in the ground, of extracting the native soil from the hollow interior of the caisson P;

with the caisson P still in place in the ground, of introducing a body of material into the hollow interior of the caisson P;

of extracting sector PB from caisson P, and removing sector PB from the ground, sector PA remaining in the ground;

of providing a second caisson Q, corresponding to caisson P, caisson Q having corresponding separable sectors QA and QB;
wherein the structure of the sectors is such that sector QA is separably engageable with sector PA when sector PB is separated from sector PA, and sector PA is separably engageable with sector QA when sector QB is separated from sector QA;

after extracting sector PB, of engaging sector QA with sector PA;

of pile-driving the caisson Q, the caisson Q having the two sectors QA and QB engaged, down into the ground;

with the caisson Q in place in the ground, of extracting the native soil from the hollow interior of the caisson Q;

with the caisson Q still in place in the ground, of introducing a body of material into the hollow interior of the caisson Q;

of extracting sector QB from caisson Q, and removing sector QB from the ground, sector QA remaining in the ground;

after extracting sector QB, of engaging sector PA with sector QA;

of enagaging sector PB once more with sector PA, thereby re-forming caisson P;

of pile-driving the caisson P, the caisson P having the two sectors PA and PB engaged, down into the ground;

of inserting and removing the caissons P and Q into the ground progressively, sector by sector, in overlapping configuration, thereby progressively forming in the ground a continuous wall of the introduced material.

15. Procedure of claim 14, wherein the caissons are provided with rail-means, which are suitable for guiding the sectors for sliding up and down with respect to each other.

16. Procedure for sealing the joints, and the bottom, of an anti-leakage in-ground barrier composed of sheet metal elements pile-driven into the ground, wherein:

the elements are formed with mechanically-interlocking edge-forms at the joints between the elements, which, when interlocked, and when the elements have been driven into the ground, define and form the walls of a cavity at the joint extending from the surface to the bottom of the barrier, the cavity being, in plan view, in series with any leak-path present in the interlocked edge-forms;

at or adjacent to the bottom of the cavity, the wall of the cavity is provided with a through-hole;

a sealant injection tube is provided, which is so adapted that the tube can be sealably connected inside the cavity to the through-hole, being sealed to the extent that sealant injected into the tube passes out through the through-hole, and does not enter the cavity;

the tube is connectable to the through-hole, inside the cavity, in such a manner than the tube can be disconnected therefrom;

the through-hole is formed with a plug-seat;

a self-sealing plug is provided, which, when urged into contact with the plug-seat, seals itself thereto, and closes off the through-hole;

the procedure includes the steps:
of placing the sealant injection tube inside the cavity, with an upper end of the tube accessible at the surface, and which extends down the cavity to, or adjacent to, the bottom thereof;
of connecting the tube to the through-hole;
of injecting sealant through the tube and through the through-hole, into the ground outside the cavity at, or adjacent to, the bottom of the cavity;
after having injected the sealant through the through-hole, of placing the plug in the tube, whereby the plug passes down the tube along with the sealant when the sealant is injected through the tube, and whereby the plug seals itself into the plug-seat;
after the plug is sealed into the plug-seat, of disconnecting the tube from the through-hole;
of passing a flush-pipe down into the cavity, from the surface, and flushing out the cavity until the cavity is clean and clear;
of passing a sealant injection tube down into the cavity, from the surface, and of injecting sealant into the cavity, from top to bottom, thereby sealing off the said leak-path at the joint.

17. Procedure of claim 16, wherein the barrier is composed of many of the said elements, interlocked at their edges, with many corresponding joints and cavities, and the procedure includes the steps:

of injecting sufficient sealant that the sealant injected at the bottom of the cavity at one joint overlaps the sealant injected from the bottom of the cavity at an adjacent joint;

and of injecting sufficient sealant to spread underneath the elements and to seal the elements to underlying impermeable soil material.

18. Procedure of claim 17, wherein the procedure includes the step, during the course of injecting the sealant at the bottom of the elements, of raising and lowering the elements periodically through a small distance, whereby the sealant is well-distributed through the soil material at the bottom of the elements.

19. Procedure for installing in the ground a prism of a treatment material and a watertight barrier comprising elements of the type that are suitable to be pile-driven into the ground, including the steps:

of providing a caisson, wherein:
the caisson has a generally tubular wall, which is such as to form a complete encirclement around a hollow interior;
the wall of the caisson is so formed as to be capable of being pile-driven into the ground as an integral whole tubular unit;

of pile-driving the caisson down into the ground;

with the caisson in place in the ground, of introducing a body of the treatment material into the hollow interior of the caisson;

of withdrawing the caisson up out of the ground, whereby a prism of the treatment material is left in the ground;

of inserting the waterproof barrier down into the ground, and of so positioning adjacent elements of the barrier that respective edges of the adjacent elements are spaced apart in such a manner as to define a physical gap or gate in the barrier, between the edges of the adjacent elements of the barrier, through which groundwater may flow;

wherein, in respect of both the said adjacent elements of the barrier:
the location of the edge of the element of the barrier during and after insertion is such that a first portion of the barrier lies outside the prism of the treatment material, and a second portion of the barrier, being a portion which includes the said edge of the element of the barrier, extends into, and lies within, the said prism of the material:
in a cross sectional plan view of the prism and the barrier after insertion of the barrier, a substantial length of the periphery of the barrier lies in contact with the said treatment material;
and the position of the barrier relative to the prism is such that groundwater may flow around the barrier and through the prism of material.

20. Procedure of claim 19, wherein:

the caisson is open at the bottom, whereby, upon the caisson being driven into the ground, the hollow interior thereof becomes filled with native soil;

the procedure includes the step of extracting the native soil from the hollow interior of the caisson, with the caisson still in place in the ground, and of then introducing the body of the treatment material into the hollow interior of the caisson.

* * * * *